(12) United States Patent
Jung et al.

(10) Patent No.: US 7,760,739 B2
(45) Date of Patent: Jul. 20, 2010

(54) WIRELESS BROADBAND (WIBRO) STATION CAPABLE OF SUPPORTING QUALITY OF SERVICE (QOS) AND METHOD FOR SERVICING QOS IN WIBRO NETWORK

(75) Inventors: Jae-Dong Jung, Seongnam-si (KR); Seong-Joon Jeon, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 644 days.

(21) Appl. No.: 11/523,066

(22) Filed: Sep. 19, 2006

(65) Prior Publication Data

US 2007/0165565 A1    Jul. 19, 2007

(30) Foreign Application Priority Data

Jan. 13, 2006 (KR) .................. 10-2006-0004068

(51) Int. Cl.
*H04L 12/56* (2006.01)
(52) U.S. Cl. ............................................. 370/395.21
(58) Field of Classification Search ................ None
See application file for complete search history.

(56) References Cited

U.S. PATENT DOCUMENTS

| | | | | |
|---|---|---|---|---|
| 6,587,433 | B1* | 7/2003 | Borella et al. .............. | 370/230 |
| 7,318,111 | B2* | 1/2008 | Zhao ........................ | 709/250 |
| 7,376,091 | B1* | 5/2008 | Eccles et al. .............. | 370/265 |
| 2002/0194350 | A1* | 12/2002 | Lu et al. .................... | 709/229 |
| 2003/0169746 | A1* | 9/2003 | Kitazawa et al. .......... | 370/395.42 |
| 2004/0107294 | A1* | 6/2004 | Chen ........................ | 709/236 |
| 2005/0037751 | A1* | 2/2005 | Kim et al. ................. | 455/432.1 |
| 2006/0098626 | A1* | 5/2006 | Park et al. ................. | 370/352 |
| 2006/0160536 | A1* | 7/2006 | Chou ........................ | 455/435.1 |
| 2007/0041385 | A1* | 2/2007 | Sali et al. .................. | 370/395.21 |

FOREIGN PATENT DOCUMENTS

| JP | 2001-024662 A1 | 1/2001 |
|---|---|---|
| WO | 2005/027537 A2 | 3/2005 |

OTHER PUBLICATIONS

Transmittal letter with a Japanese Office action dated Jun. 9, 2009 in the corresponding Japanese Patent Application No. 2006-265024.
TCP/IP Protocol Architecture http://technet.microsoft.com/en-us/library/cc958821.aspx.
Protocol Computing http://en.wikipedia.org/wiki/Protocol_(computing).

* cited by examiner

*Primary Examiner*—Chirag G Shah
*Assistant Examiner*—Daniel Mitchell
(74) *Attorney, Agent, or Firm*—H.C. Park & Associates, PLC

(57) ABSTRACT

A wireless broadband (WiBro) station is capable of supporting Quality of Service (QoS), and a method provides the QoS service in a WiBro network. A High_MAC processor is additionally constructed to parse a packet inputted from an application layer, assigns a QoS class according to a feature of the parsed packet, and transmits the packet through a channel corresponding to the assigned QoS class, thereby performing a QoS service through a separate QoS processing module provided between the application layer and a Media Access Control (MAC) layer. Thus, a burden imposed on the MAC layer is reduced, and a faster QoS service is provided.

14 Claims, 8 Drawing Sheets

FIG. 5

| Service Type | Packet Type | Destination IP | TOS (4bit) | MBZ | Port | QoS Type |
|---|---|---|---|---|---|---|
| VoIP | Signaling | VoIP SIP server | 0000 | 1 | 5060 | BE |
| VIDEO COMMUNICATION | Voice and Video | - | 0111 | 1 | | rt-VR |
| PTA | Signaling | GLMS | 0000 | 1 | | BE |
| | Signaling | MRS | 0000 | 1 | | BE |
| | DATA TRANSMISSION | - | 0011 | 1 | 21 | BE |
| | CHARACTER CHATTING | - | 0100 | 1 | | BE |
| | PTT | - | 0101 | 1 | | rt-VR |
| | VIDEO CHATTING | - | 0110 | 1 | | rt-VR |
| MMS | Signaling | MMS SIP server | 0000 | 1 | | BE |
| | MMS packet | - | 0010 | 1 | | nrt-VR |
| Web Browser | http packet | - | 0001 | 1 | | BE |

FIG. 6

| TOS | Service | QoS Type |
|---|---|---|
| 0000 | DESTINATION IP ADDRESS REFERENCE | BE |
| 0001 | WEB BROWSER | BE |
| 0010 | CHARACTER CHATTING | BE |
| 0011 | DATA TRANSMISSION | BE |
| 0100 | MMS service | nrt-VR |
| 0101 | PTT | rt-VR |
| 0110 | VIDEO COMMUNICATION | rt-VR |
| 0111 | VoIP data | rt-VR |
| 1000 | ... | ... |
| 1001 | ... | ... |
| 1010 | ... | ... |
| 1011 | ... | ... |
| 1100 | ... | ... |
| 1101 | ... | ... |
| 1110 | ... | ... |
| 111 | ... | ... |

WIRELESS BROADBAND (WIBRO) STATION CAPABLE OF SUPPORTING QUALITY OF SERVICE (QOS) AND METHOD FOR SERVICING QOS IN WIBRO NETWORK

CLAIM OF PRIORITY

This application makes reference to, incorporates the same herein, and claims all benefits accruing under 35 U.S.C. §119 from an application for WIBRO STATION SUPPORTING QoS AND METHOD FOR SERVICING QoS IN WIBRO NETWORK earlier filed in the Korean Intellectual Property Office on the 13 Jan. 2006 and there duly assigned Serial No. 10-2006-0004068.

BACKGROUND OF THE INVENTION

1. Technical Field

The present invention relates to a wireless broadband (WiBro) station capable of supporting Quality of Service (QoS) and a method for servicing the QoS in a WiBro network.

2. Related Art

Wireless Broadband (WiBro) is a super-speed portable Internet service that mainly targets data communication, as well as Quality of Service (QoS)-based high-quality multimedia data such as voice, image and so on, using a frequency of 2.3 GHz. It allows the data communication and the use of the Internet even during high-speed movement, and it is based on the standard IEEE 802.16e.

One feature of the WiBro service is to provide a differentiated service, i.e. a QoS service, according to the type of service that a subscriber uses. Therefore, the WiBro network and system are designed so as to be able to support the QoS at a Media Access Control (MAC) layer on the basis of the standard IEEE 802.16e. In general, among QoS services, the lowest level of service is a Best Effort (BE) service, which equally treats all traffic independent of the application or the state of a station.

A method for distinguishing packets by applications in the network layer includes Internet Protocol Type Of Service (IPTOS), Differentiated Services Code Point (DSCP), and so on. IPTOS is used by defining an 8-bit service field in an Internet Protocol version 4 (IPv4) packet, wherein the service field includes a 4-bit Type Of Service (TOS) field. DSCP or DiffServ is a new model in which traffic is treated by intermediate systems with a relative priority based on the TOS field. DiffServ architecture defines a DiffServ (DS) field, which supersedes the ToS field in IPv4.

For the QoS service, procedures for QoS negotiation, acceptance control, wireless section band request and allocation between the stations, the relay and the core network should be carried out. QoS negotiation refers to negotiation between QoS that the station requests (Active QoS), QoS that the base station can accept (Admitted QoS), and QoS that is registered with an authentication server according to each subscriber (Provisioned QoS). Acceptance control is carried out through Access Point (AP) flow, AP handover, Packet Access Router (PAR) flow, and PAR handover. The wireless section band request and allocation broadcast information on a frame configuration using a DownLink-Mobile Application Part (DL-MAP) and UpLink-MAP (UL-MAP) according to each frame. The station transmits data in a corresponding section.

Measurement of QoS occurs at the base station and PAR according to each registered service. When a traffic packet is received, a determination is made as to whether or not the packet is within a traffic descriptor negotiated based on a time and a data rate. If the packet is not within the negotiated traffic descriptor, the base station and PAR cannot process the traffic with respect to the packet.

In order for the base station to identify a UL section user, information on a mobile station-specific band request is required. The mobile station requests a UL band with a band request message or a data grant message using a piggyback function. In a contention-based band request, the mobile station initially uses a Code Division Multiple Access (CDMA) code in order to make a request to the base station to transmit the data. The base station allocates a band corresponding to the band request message to the received band request CDMA code. The mobile station transmits the band request message to the base station with the allocated band, and presents the band request message with the requested UL band. The base station reflects information on the request band in UL scheduling. The contention-based band request is provided to each user in a unicast mode, and thus is not applied to a multicast or broadcast service.

In a polling-based band request, the base station allocates the UL section band to the mobile station, thereby collecting information. The mobile station records a data rate to be transmitted on the band request message, and transmits the recorded band request message to the base station. The base station performs scheduling on the basis of the collected information, and allocates a user-specific band to the UL section according to results of the scheduling.

When data to be transmitted exists in a buffer at the mobile station's request for a band, a piggyback band request is used to request the band by addition to transmitted traffic, and transmits a data sub-header to the base station together with information on an additional band request. The base station recognizes a band adding an additional band to a band that is previously requested but not allocated as band request information which the mobile station requests, and applies the recognition to the UL scheduling.

As observed above, the 802.16e standard for the WiBro service uses a method of classifying the packets with a classifier allocated to Layer 2 in order to provide QoS. Thus, in order to give a QoS level according to the feature of the packet, all application packets should be parsed in Layer 2, and thereby the feature of each packet should be analyzed. Consequently, the parsing in Layer 2 increases the burden imposed on a modem.

SUMMARY OF THE INVENTION

It is, therefore, an object of the present invention to provide a wireless broadband (WiBro) station capable of supporting Quality of Service (QoS) and a method for servicing the QoS in a WiBro network, in which a separate QoS processing module is provided between an application layer and a Media Access Control (MAC) layer, so that the separate QoS processing module, rather than the MAC layer, performs QoS processing to detect a feature of a packet according to an application which the WiBro network can provide, and for determining what type of service packet the packet is.

According to an aspect of the present invention, a wireless broadband (WiBro) station capable of supporting Quality of Service (QoS) comprises: a High_MAC processor which parses a packet input from an application layer, assigns a QoS class according to a feature of the parsed packet, and transmits the packet through a channel corresponding to the given QoS class; and a High_MAC driver which provides an interface for the packet input/output from/to the High_MAC processor.

The High_MAC processor preferably includes a QoS table which defines the QoS class assigned according to the service type and the packet type.

Furthermore, the QoS table includes information as to a Must Be Zero (MBZ) field indicating whether to apply a QoS service, a Type Of Service (TOS) field indicating the packet type, and a QoS Type field.

Preferably, the QoS class is classified into a real-time-variable rate (rt-VR) having the highest priority for a real-time service, a non-real-time-variable rate (nrt-VR) having a middle priority, and a Best Effort (BE) having the lowest priority.

The WiBro station may further comprise a connection manager for executing, stopping executing, and controlling the application.

The High_MAC processor preferably parses the packet received from a base station (BS), detects a service type and a packet type which a Type Of Service (TOS) field of the packet indicate, and transmits the packet to the application layer providing a corresponding service.

Furthermore, the packet which the High_MAC processor transmits to a Media Access Control (MAC) layer may include a Type Of Service (TOS) field indicating a packet type, a Must Be Zero (MBZ) field indicating whether to provide a QoS service, and an Internet Protocol (IP) field for a destination address.

The WiBro station preferably further comprises: a Media Access Control (MAC) processor for performing 802.16 MAC processing of the packet input/output from/to the High_MAC driver; and a PHYscial (PHY) processor for performing 802.16 PHY processing of the packet input from the MAC processor, and for transmitting the packet to an external wireless network.

According to another aspect of the present invention, a method for servicing Quality of Service (QoS) in a wireless broadband (WiBro) network comprises the steps of: preparing a QoS table defining a QoS class assigned according to a service type and a packet type at a High_MAC processor located between an application layer and a Media Access Control (MAC) layer; parsing, by means of the High_MAC processor, a packet received from the application layer, retrieving a type of the parsed packet on the QoS table, and assigning a QoS class corresponding to the retrieved packet type; and transmitting the packet to which the QoS class is assigned to the MAC layer.

The method may further comprise the step of parsing the packet received from a base station (BS), detecting the service type and the packet type which a Type Of Service (TOS) field of the packet indicates, and transmitting the packet to the application layer providing a corresponding service.

Preferably, the packet to which the QoS class is assigned includes a Type Of Service (TOS) field indicating the packet type, a Must Be Zero (MBZ) field indicating whether to provide a QoS service, and an Internet Protocol (IP) field for a destination address.

According to yet another aspect of the present invention, a method for servicing Quality of Service (QoS) in a wireless broadband (WiBro) network comprises the steps of: preparing a QoS table defining a QoS class assigned according to a service type and a packet type at a High_MAC processor located between an application layer and a Media Access Control (MAC) layer; detecting, by means of the High_MAC processor, a type of packet input from an external network through the MAC layer, retrieving the detected packet type on the QoS table, and giving a QoS class corresponding to the retrieved packet type; and transmitting the packet to which the QoS class is assigned to the application layer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 5 is a diagram of a QoS table according to an exemplary embodiment of the present invention;

FIG. 6 is a diagram of Type Of Service (TOS) field-specific service types in a table form in accordance with an exemplary embodiment of the present invention;

DETAILED DESCRIPTION OF THE INVENTION

Hereinafter, exemplary embodiments of the present invention are described in detail with reference to the accompanying drawings.

Figure 1:
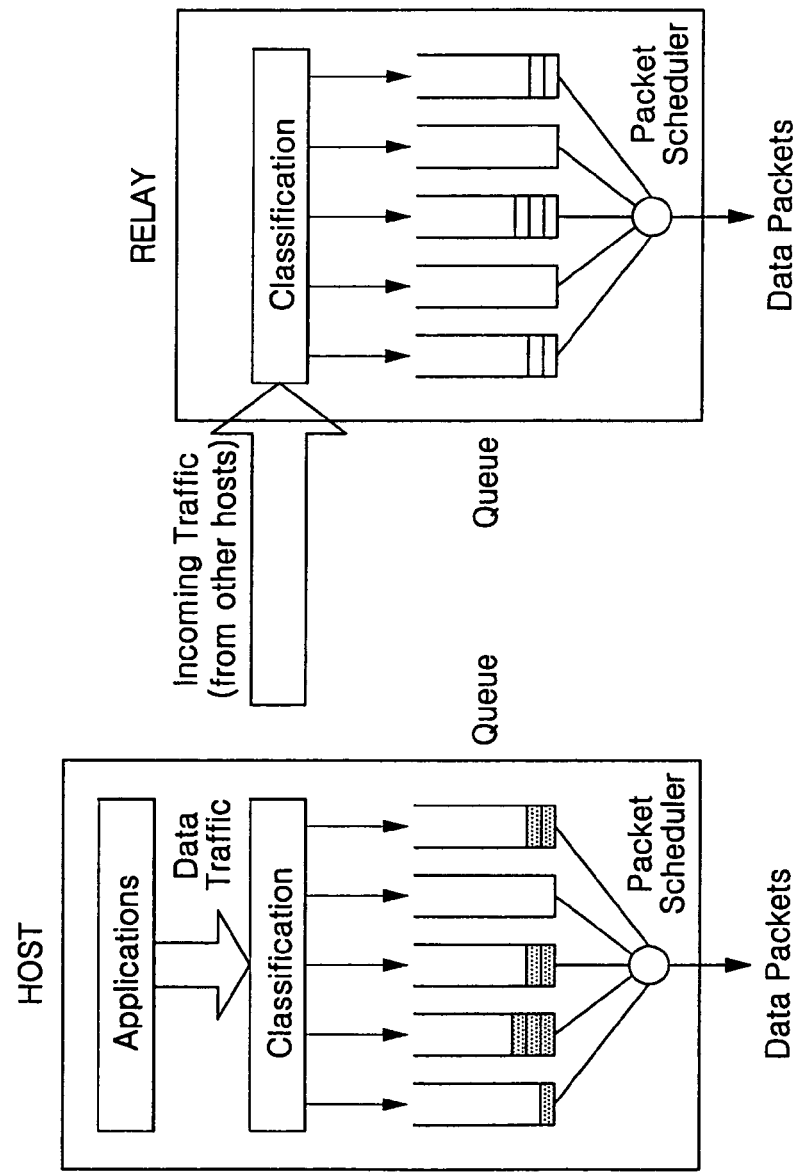
FIG. 1 is a diagram of a method of classifying packets for providing Quality of Service (QoS) in a wireless network.

FIG. 1 is a diagram of a method of classifying packets for providing Quality of Service (QoS) in a wireless network.

Referring to FIG. 1, in order to apply a QoS mechanism in the wireless network, the QoS mechanism should be applied to all pieces of equipment constituting the wireless network, including a terminating host of the network, a router, and a relay such as a base station. In other words, the host or relay classifies packets which are to be transmitted or are received according to service type, stores the classified packets in each queue, and then transmits the stored packets by packet scheduling.

Figure 2:
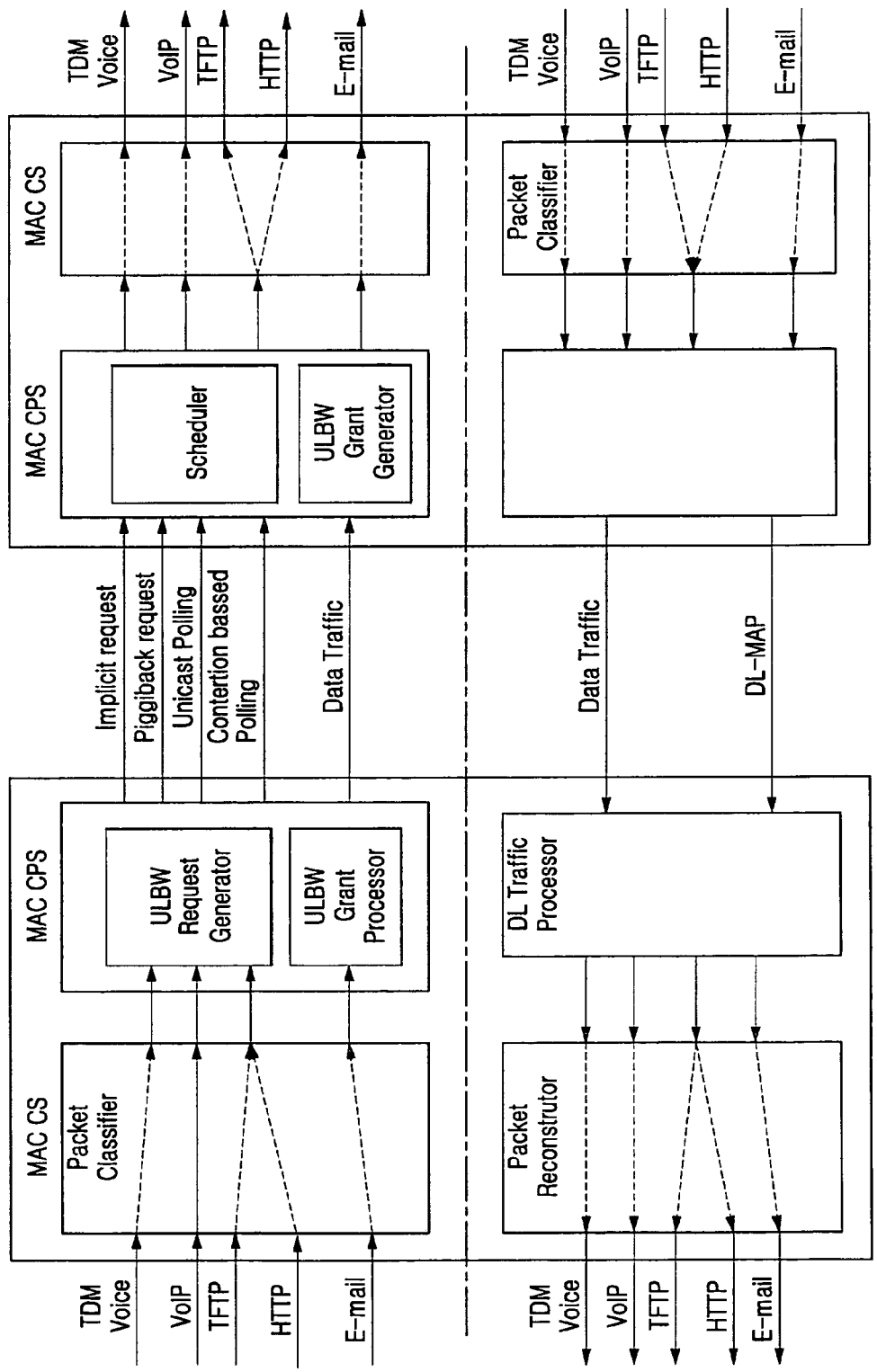
FIG. 2 is a diagram illustrating realization of QoS in a wireless broadband (WiBro) network.

FIG. 2 is a diagram illustrating realization of QoS in a wireless broadband (WiBro) network.

Referring to FIG. 2, IEEE 802.16e classifies the traffic into Time Division Multiplex (TDM) voice, Voice over Internet Protocol (VoIP), Trivial File Transfer Protocol (TFTP), hypertext transfer protocol (HTTP), E-main and so on, thereby realizing QoS.

Figure 3:
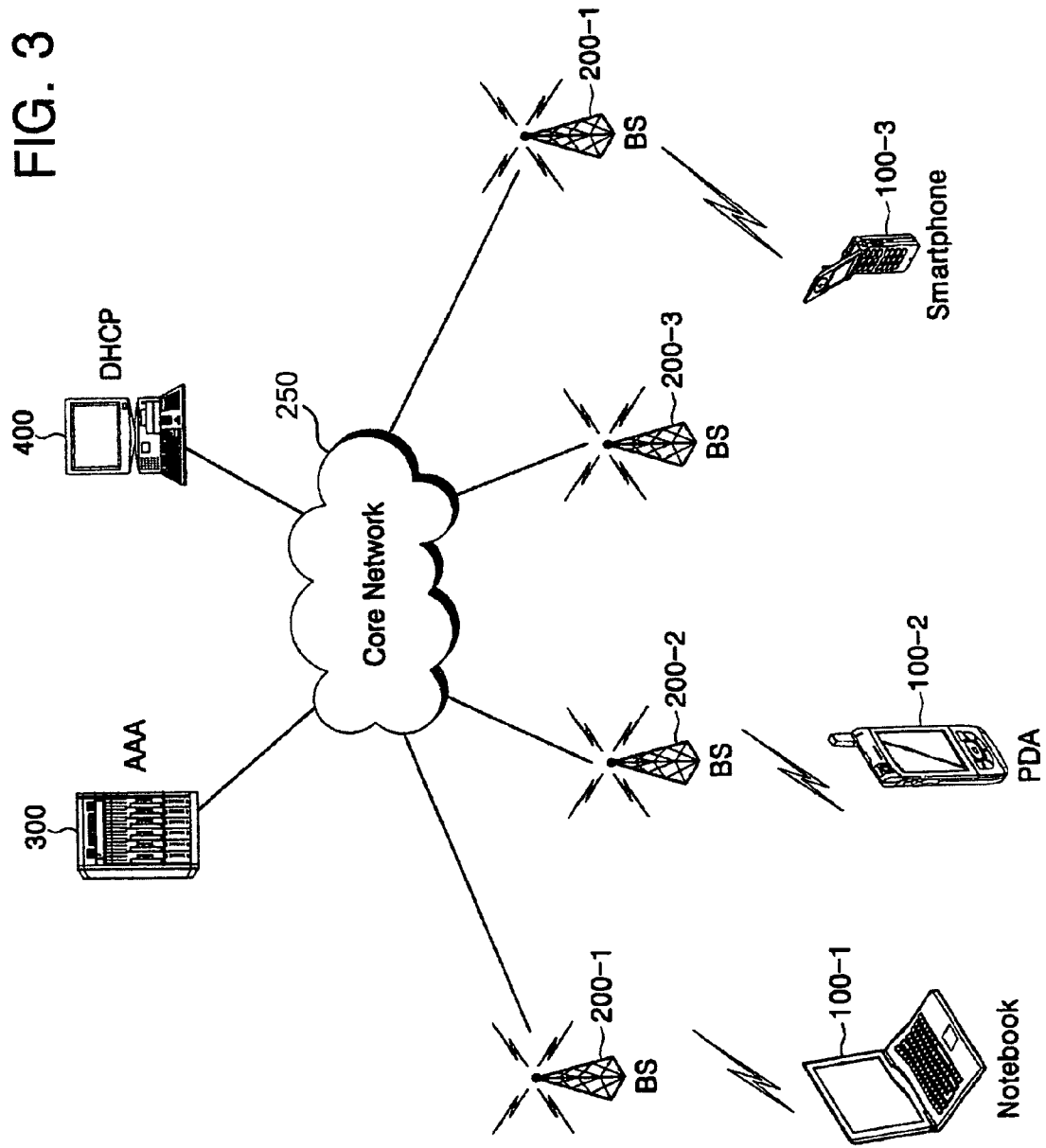
FIG. 3 illustrates the architecture of a WiBro network to which the present invention is applied.

FIG. 3 illustrates the architecture of a WiBro network to which the present invention is applied.

Referring to FIG. 3 a WiBro station 100-1, 100-2 and 100-3 communicates with abase station (BS) 200-1, 200-2 and 200-3, respectively, by wireless, and each BS 200-1, 200-2 and 200-3, respectively, is connected to a core network 250 of a provider by wire. The WiBro station 100-1, 100-2 and 100-3 may be various electronic devices such as a notebook computer, a personal digital assistant (PDA), a smart phone, and so on.

Similar to a wireless Local Area Network (LAN), an Authentication Authorization Accounting (AAA) server 300 for authenticating a user and a station is located on one side of the core network 250 for the WiBro network. In addition, a Dynamic Host Configuration Protocol (DHCP) server 400 for assigning an Internet Protocol (IP) address to the user is included in the WiBro network.

Figure 4:
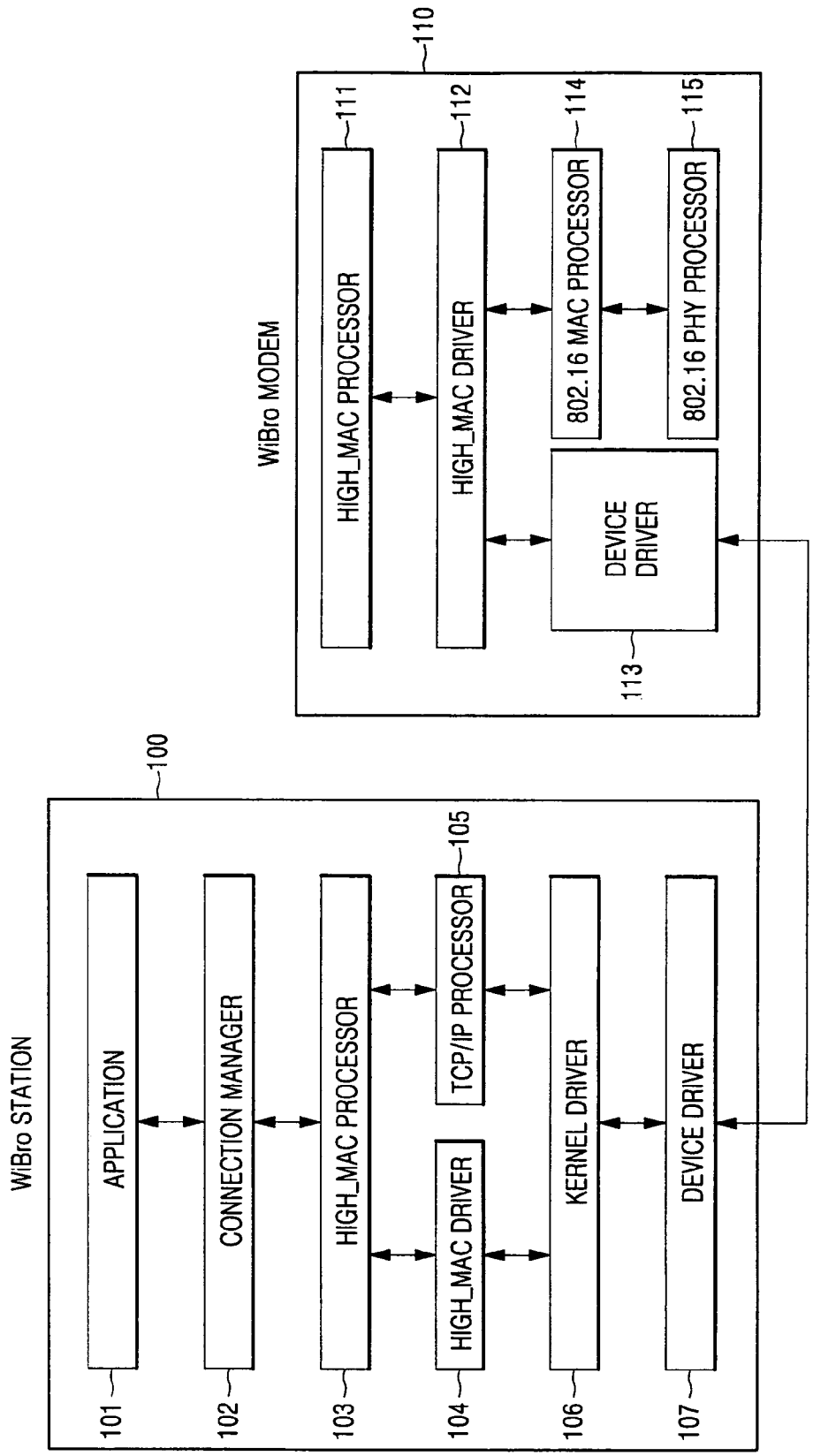
FIG. 4 is a block diagram of a WiBro station and a WiBro modem in accordance with an exemplary embodiment of the present invention.

FIG. 4 is a block diagram of a WiBro station and a WiBro modem in accordance with an exemplary embodiment of the present invention.

A WiBro station 100 of the present invention includes an application 101, a connection manager 102 for executing, stopping executing and controlling various applications installed on an operating system (OS), a Transmission Control Protocol (TCP)/IP processor 105, a kernel driver 106, and a device driver 107, which are basic components of a general WiBro station, and the WiBro station 100 additionally includes a packet classification module or a High_MAC processor 103 and a High_MAC driver 104.

The High_MAC processor 103 parses packets inputted from the application 101 through the connection manager 102 so as to classify QoS levels according to a feature of traffic. At this point, a parsed part of the packet is an IP header. Each packet is assigned a QoS level using a Must Be Zero (MBZ) field, a Type Of Service (TOS) field, and a destination IP address field. The High_MAC processor 103 is a module for substantially processing a control message between the WiBro station 100 and the WiBro modem 110, processes a QoS message received from the High_MAC driver 104, and communicates with the applications 101 installed on the OS through the connection manager 102. A detailed technique of assigning the QoS level will be described below with reference to FIGS. 5 and 6.

The High_MAC driver 104 is a user level driver constructed with an Application Program Interface (API) provided in the OS of the WiBro station 100, and provides a transmission/reception interface for the High_MAC processor 103. The High_MAC driver 104 also transmits the packets inputted from the High_MAC processor 103 to the kernel driver 106 with reference to a classification policy, a priority policy and a QoS policy, and also transmits to the High_MAC processor 103 packets inputted from the WiBro modem 110 through the device driver 107 and the kernel driver 106.

The WiBro modem 110, which makes it possible to provide WiBro service in connection with the WiBro station 100, includes an 802.16 MAC processor 114, an 802.16 PHY processor 115, and a device driver 113, which are components of a general WiBro modem, and additionally includes a High_MAC processor 111 and a High_MAC driver 112.

The High_MAC processor 111 and High_MAC driver 112 of the WiBro modem 110 have substantially the same function as the High_MAC processor 103 and High_MAC driver 104, respectively, of the WiBro station 100. Specifically, the High_MAC processor 111 parses a packet received from an application layer so as to assign a QoS class according to a feature of the parsed packet, and transmits the packet through a channel corresponding to the given QoS class. The High_MAC driver 112 provides an interface for a packet input from or output to the High_MAC processor 111. It is the point of the present invention that the type of packet of the application is detected by allocating a so-called High MAC layer between an application layer and a Media Access Control (MAC) layer.

Meanwhile, the WiBro station 100 and modem 110 are implemented as separate elements as shown in FIG. 4, but the may be implemented in an integrated form, for instance, where the WiBro modem 110 is built into a notebook computer.

FIG. 5 is a diagram of a QoS table according to an exemplary embodiment of the present invention.

In general, the IP header contains the destination IP address field, the TOS field, and the MBZ field. In the present invention, QoS is realized using the three fields contained in the IP header.

The table of FIG. 5 shows an example of configuring the TOS field according to a service type and a packet type. An MBZ field of FIG. 5 is not generally well used, but is used for distinguishing a QoS unsupported, ordinary application and a QoS supported application in the present invention. When an MBZ bit is 0, this is considered as an application that does not use QoS. When the MBZ bit is 1, this is considered as an application that uses QoS.

The table of FIG. 5 is divided into a service type, a packet type, a destination, a TOS, an MBZ, a QoS type, and so on.

Generally, the service type provided through the WiBro network includes a VoIP video communication, a Push To All (PTA), a Multimedia Messaging System (MMS), a web browser, and so on. It is seen that each service is classified into two types: a signaling packet and a data packet.

VoIP is a communication system which can call another party using a dialer similar to that of a general mobile phone or using a body list, and which transmits a voice packet through an IP network. Video Telephony (VT) is a communication system which communicates with another party with image data added to the VoIP.

The PTA can support a one-to-many voice communication service known as Push To Talk (PTT), a video communication service known as Push To View (PTV), and a data transmission service known as Push To Data (PTD). Among them, the PTT is a service which supports one-to-many communication (or group communication) on a wireless Internet, a packet network. Thus, a PTT system allows one member of a group who has a terminal to communicate with other members of the same group, and typically depends on a single frequency, i.e. a dedicated channel. Because the dedicated channel is used, the PTT has no alternative but to employ a half-duplex communication system. The half-duplex communication system is one in which data can be transmitted in either direction but not in both directions at the same time. In other words, when one side transmits data, the other side can only receive the data. Thus, data transmission is allowed on the other side only when it is completed on one side.

The PTV is technology which is capable of simultaneously transmitting a live video of any person to other persons in real time. The PTV has a function similar to that of a video conference, but is different from a general video conference in that it is a unidirectional transmission. The PTV allows unidirectional transmission to numerous persons at the same time only for a time when a user wants it, and thus can provide the video conference function at a considerably inexpensive cost. Furthermore, the PTD provides a service of transmitting data to a plurality of persons at the same time. Instant Message (IM) refers to a computer application which makes it possible to perform immediate text communication between two or more persons through a network such as the Internet.

Meanwhile, the MMS is a concept which evolves a Short Message Service (SMS), and which transmits not only a text message as in the SMS but also various multimedia contents, such as image or video and audio, through a wireless network using a Wireless Application Protocol (WAP).

The destination column of FIG. 5 indicates the destination IP address to which each packet is transmitted. The destination of a VoIP signaling packet is a VoIP Session Initiation Protocol (SIP) server, and the destination of a PTA signaling packet is a Group and List Management Server (GLMS) or a Message Retrieval Server (MRS), and the destination of an MMS signaling packet is an MMS SIP server. It can be seen from FIG. 5 that all of the signaling packets have the TOS field set to "0000." Furthermore, it can be seen that the QoS type assigned to the signaling packet is a Best Effort (BE).

It can be seen that packets other than the signaling packet, which are distinguished by the service and packet types, are set to different TOS values. Specifically, in the VoIP video communication service, a video/audio data packet is set to "0111." In the PTA service, a data transmission packet is set to "0011," a character chatting packet is set to "0100," a PTT packet is set to "0101," and a video chatting packet is set to "0110." Furthermore, in the MMS service, an MMS packet is set to "0010." In the web browser service, an http packet is set to "0001." Rearranging the table on the basis of correlation between the TOS field and the QoS Type field, the table can be seen as in FIG. 6.

FIG. 6 is a diagram of Type Of Service (TOS) field-specific service types in a table form in accordance with an exemplary embodiment of the present invention.

The TOS field is made up of a total of 4 bits. Thus, the service types which the TOS field can express are 16 in total. Referring to FIG. 6, it is seen that the QoS type is set to BE with respect to the signaling, web browser, character chatting, and data transmission packets, the TOS fields of which are set to "0000" through "0011" in sequence.

Furthermore, with regard to the MMS service having a TOS field of "0100," the QoS type is set to a non-real-time-variable rate (nrt-VR). The PTT, the video communication, and the VoIP data, which have the TOS fields set to "0101," "0110," and "0111", respectively, are set to a real-time-variable rate (rt-VR).

In this regard, the BE is the QoS type having the lowest class, and is generally assigned to a File Transfer Protocol (FTP), web browsing, an application program such as an e-mail, and so on. The nrt-VR is the QoS type having a middle class which is not sensitive to a delay. The rt-VR is the QoS type having the highest class, such as a real-time service, which is sensitive to a delay.

As mentioned above, since the signaling packet of the application uses the BE channel and has the TOS field set to "0000," the BS or Access Control Router (ACR) receiving the packet having the TOS field set to "0000" determines when execution of a corresponding application is started through the destination IP address contained in the signaling packet. The WiBro modem activates the channel corresponding to each application, and transmits the application data packet after the TOS and MBZ fields of the IP header of the packet are set. In the High_MAC layer, the IP header of the packet of the application is parsed, and the packet is transmitted to the channel corresponding to the QoS class of interest with reference to the obtained TOS and MBZ in the TOS table of FIG. 6.

As observed through FIGS. 5 and 6, the QoS type is distinguished using the rest, the TOS and MBZ fields, other than a 3-bit Preamble of the IP header in the present invention. The Preamble bit is not generally well used, but may be used depending on the type of network. Thus, in the exemplary embodiments of FIGS. 5 and 6, the QoS type is distinguished without using the Preamble bit. However, if the network is limited to the WiBro network, the Preamble bit may be used to distinguish the QoS type. Moreover, if the Preamble bit is used to distinguish the QoS type, a greater number of application services can be defined.

Figure 7:
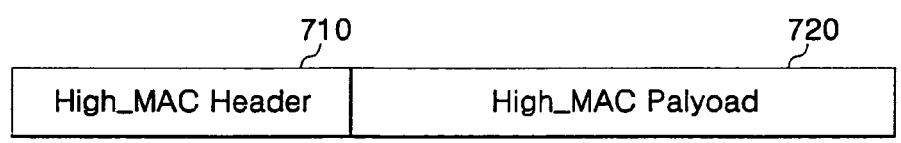
FIG. 7 is a diagram of the message format of a High_MAC layer in accordance with an exemplary embodiment of the present invention.

FIG. 7 is a diagram of the message format of a High_MAC layer in accordance with an exemplary embodiment of the present invention.

A High_MAC header 710 is used for interface control and data transmission between the WiBro station and the WiBro modem, and is varied in format according to the type of interface. A High_MAC payload 720 is a part in which data transceived between the WiBro station and the WiBro modem is contained, wherein the data is classified into practical data and control data.

Figure 8:
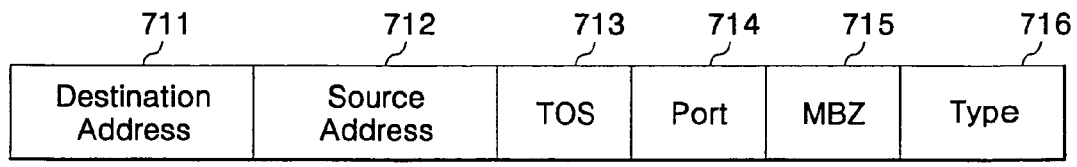
FIG. 8 is a diagram of the format of a High_MAC header in accordance with an exemplary embodiment of the present invention.

FIG. 8 is a diagram of the format of a High_MAC header in accordance with an exemplary embodiment of the present invention.

The High_MAC header of FIG. 8 is used to illustrate the High_MAC header 710 of FIG. 7 in detail, and contains several fields. As can be seen through the format of the High_MAC header of FIG. 8, the High_MAC header of the present invention basically contains the following fields: Destination Address 711, Source Address 712, TOS 713, Port 714, BMZ 715, and Type 716, as in the format of an existing Ethernet header. However, in the present invention, the two fields TOS 713 and MBZ 715 are different from those of an ordinary IP packet. Furthermore, data containing a Payload following the header is distinguished between substantial data and High_MAC control data using the Type field 716.

Figure 9:
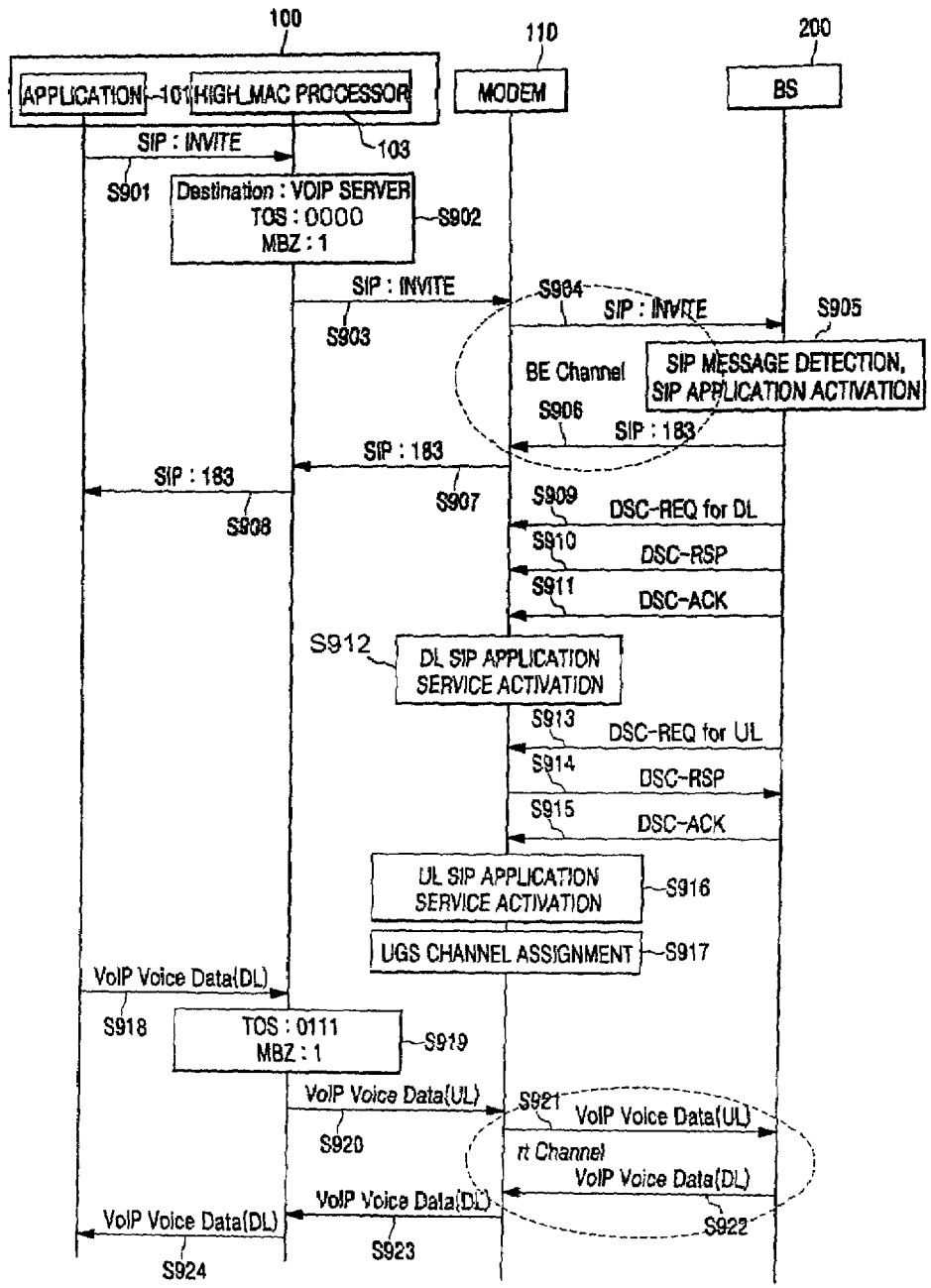
FIG. 9 is a diagram illustrating the flow of signals for providing a VoIP service through a QoS supporting WiBro network.

FIG. 9 is a diagram illustrating the flow of signals for providing a VoIP service through a QoS supporting WiBro network.

An INVITE message is transmitted from the application 101 of the station 100 which provides a VoIP service using SIP to the High_MAC processor 103 (S901). When it is confirmed that a destination of the received INVITE message is a VoIP server, and that the received INVITE message is a signaling message, the High_MAC processor 103 sets the TOS field of the packet header to "0000," and sets the MBZ field to "1" (S902). The INVITE message, the QoS relevant fields of which are set, is transmitted to the BS 200 via the WiBro modem 110 (S903 and S904). The BS 200 detects that the received INVITE message is an SIP message, activates an SIP application (S905), and transmits an SIP 183 message, reporting that the process is under way, to the station 100 (S906, S907 and S908)

The BS 200 activates an SIP application, and transmits a Dynamic Service Change-Request (DSC-REQ) message, thereby activating DownLink (DL) and Up Link (UL) SIP application services with the station 100 (S909 thru S916).

At this point, the messages exchanged between the WiBro modem 110 and the BS 200 include DSC-REQ, Dynamic Service Change-Response (DSC-RSP), Dynamic Service Change-Acknowledgment (DSC-ACK), and so on. The DSC-REQ message is a message transmitted when the station 100 or BS 200 intends to change current parameters of service flow. One DSC-REQ message includes only parameters of one service flow. The DSC-RSP message is a response message to the DSC-REQ message. The DSC-ACK message is a message which is transmitted to the other party in response to reception of the DSC-REP.

The WiBro modem 110 activates the DL SIP application (S912) by exchanging the DSC-REQ message for a downlink (S909), and thus the DSC-RSP (S910) and SDC-ACK (S911), and activates the UL SIP application (S916) by exchanging the DSC-REQ message for an uplink (S913), and thus the DSC-RSP (S914) and SDC-ACK (S915). In this state, the WiBro modem 110 assigns an Unsolicited Grant Service (UGS) channel in order to provide the VoIP service (S917).

After the UGS channel is established between the WiBro modem 110 and the BS 200, when voice data is inputted from the application 101 of the station 100 (S918), the High_MAC processor 103 of the station 100 sets the TOS field to "0111", which indicates VoIP voice data, sets the MBZ field to "1" (S919), and transmits the VoIP voice data to the WiBro modem 110 (S920). The WiBro modem 110, upon receiving a message in which a QoS type is indicated, parses the TOS field of the IP header of the message, and thereby it knows that the received message contains the VoIP voice data. The WiBro modem 110 transmits the VoIP voice data to the BS 200 through the UGS channel (S921). As set forth above, the UGS channel provides real-time service. While the UGS channel is established, the VoIP voice data directed from the other party to the station 100 is transmitted from the BS 200 through the WiBro modem 110 to the WiBro station 100 (S922, S923 and S924).

As can be seen from the foregoing, the present invention performs the QoS service through the separate QoS processing module provided between the application layer and the MAC layer, so that it reduces a burden imposed on the MAC layer and provides faster QoS service.

Although exemplary embodiments of the present invention have been described, it will be understood by those skilled in the art that the present invention should not be limited to the described exemplary embodiments. Rather, various changes and modifications can be made within the spirit and scope of the present invention, as defined by the following claims.

What is claimed is:

1. A wireless broadband (WiBro) station supporting Quality of Service (QoS), the WiBro station comprising:
   a High_MAC processor means for parsing a packet input from an application layer, assigning a QoS class according to a feature of the parsed packet, and transmitting the packet through a channel corresponding to the assigned QoS class, the High_MAC processor means including a QoS table and the QoS table including information as to a Must Be Zero (MBZ) field indicating whether to apply a QoS service, a Type Of Service (TOS) field indicating the packet type, and a QoS Type field; and
   a High_MAC driver means for providing an interface for packet input and output from and to, respectively, the High_MAC processor means.

2. The WiBro station of claim 1, wherein the High_MAC processor means includes the QoS table which defines the QoS class assigned according to a service type and a packet type.

3. The WiBro station of claim 1, wherein the QoS class is classified into a real-time-variable rate (rt-VR) having the highest priority for a real-time service, a non-real-time-variable rate (nrt-VR) having a middle priority, and a Best Effort (BE) having a lowest priority.

4. The WiBro station of claim 1, further comprising a connection manager for executing, stopping execution of, and controlling the application.

5. The WiBro station of claim 1, wherein the High_MAC processor means parses a packet received from a base station (BS), detects a service type and a packet type which a Type Of Service (TOS) field of the packet indicates, and transmits the packet to the application layer providing a corresponding service.

6. The WiBro station of claim 1, wherein the High_MAC processor means transmits the packet to a Media Access Control (MAC) layer, the packet including a Type Of Service (TOS) field indicating a packet type, a Must Be Zero (MBZ) field indicating whether to provide a QoS service, and an Internet Protocol (IP) field for a destination address.

7. The WiBro station of claim 1, further comprising:
   a Media Access Control (MAC) processor for performing 802.16 MAC processing of the packet input and output from and to, respectively, the High_MAC driver means; and
   a PHYscial (PHY) processor for performing 802.16 PHY for processing a packet input from the MAC processor, and for transmitting the packet to an external wireless network.

8. A method for providing Quality of Service (QoS) service in a wireless broadband (WiBro) network, the method comprising the steps of:
   preparing a QoS table defining a QoS class assigned according to a service type and a packet type at a High_MAC processor located between an application layer and a Media Access Control (MAC) layer;
   parsing, by means of the High_MAC processor, a packet received from the application layer, retrieving a type of the parsed packet from the QoS table, and assigning a QoS class corresponding to the retrieved type of the parsed packet; and
   transmitting to the MAC layer the packet to which the QoS class is assigned,
   wherein the QoS table includes information as to a Must Be Zero (MBZ) field indicating whether to apply a QoS service, a Type Of Service (TOS) field indicating the packet type, and a QoS Type field.

9. The method of claim 8, wherein the QoS class is classified into a real-time-variable rate (rt-VR) having a highest priority for a real-time service, a non-real-time-variable rate (nrt-VR) having a middle priority, and a Best Effort (BE) having a lowest priority.

10. The method of claim 8, further comprising the step of parsing a packet received from a base station (BS), detecting the service type and the packet type which a Type Of Service (TOS) field of the packet indicates, and transmitting the packet to the application layer providing a corresponding service.

11. The method of claim 8, wherein the packet to which the QoS class is assigned includes a Type Of Service (TOS) field indicating a packet type, a Must Be Zero (MBZ) field indicating whether to provide a QoS service, and an Internet Protocol (IP) field for a destination address.

12. A method for providing Quality of Service (QoS) service in a wireless broadband (WiBro) network, the method comprising the steps of:
   preparing a QoS table defining a QoS class assigned according to a service type and a packet type at a High_MAC processor located between an application layer and a Media Access Control (MAC) layer;
   detecting, by means of the High_MAC processor, a type of packet inputted from an external network through the MAC layer, retrieving the detected type of packet on the QoS table, and assigning a QoS class corresponding to the retrieved detected type of packet; and
   transmitting to the application layer the packet to which the QoS class is assigned,
   wherein the QoS table includes information as to a Must Be Zero (MBZ) field indicating whether to apply a QoS service, a Type Of Service (TOS) field indicating a packet type, and a QoS Type field.

13. The method of claim 12, wherein the QoS class is classified into a real-time-variable rate (rt-VR) having a highest priority for a real-time service, a non-real-time-variable rate (nrt-VR) having a middle priority, and a Best Effort (BE) having a lowest priority.

14. The method of claim 12, wherein the packet to which the QoS class is assigned includes a Type Of Service (TOS) field indicating packet type, a Must Be Zero (MBZ) field indicating whether to provide a QoS service, and an Internet Protocol (IP) field for a destination address.

* * * * *